United States Patent [19]

Bloomfield et al.

[11] Patent Number: 4,974,083
[45] Date of Patent: Nov. 27, 1990

[54] RECIRCULATING SPECIAL EFFECTS VIDEO FRAMESTORE

[75] Inventors: John F. Bloomfield, Salem, Mass.; David E. Trytko, Foster City, Calif.

[73] Assignee: Ampex Corporation, Redwood City, Calif.

[21] Appl. No.: 407,722

[22] Filed: Sep. 13, 1989

Related U.S. Application Data

[60] Continuation of Ser. No. 195,370, May 11, 1988, abandoned, which is a continuation of Ser. No. 943,282, Dec. 8, 1986, abandoned, which is a continuation-in-part of Ser. No. 722,532, Apr. 12, 1985, abandoned, which is a division of Ser. No. 109,990, Oct. 19, 1987, abandoned, which is a division of Ser. No. 110,249, Oct. 19, 1987, abandoned.

[51] Int. Cl.$^5$ ............... H04N 5/262; H04N 9/74
[52] U.S. Cl. ............... 358/160; 358/140; 358/183; 358/22
[58] Field of Search ............ 358/22, 140, 160, 166, 358/167, 183

[56] References Cited

U.S. PATENT DOCUMENTS

| | | | |
|---|---|---|---|
| 3,499,982 | 3/1970 | O'Neal | 316/544 |
| 3,728,479 | 4/1973 | Srinivasan | 358/183 |
| 4,058,836 | 11/1977 | Drewery | 358/167 |
| 4,090,218 | 5/1978 | van Buul et al. | 358/37 |
| 4,163,249 | 7/1979 | Michael et al. | 358/21 |
| 4,168,510 | 9/1979 | Kaiser | 358/183 |
| 4,207,596 | 6/1980 | Pires | 358/182 |
| 4,214,263 | 7/1980 | Kaiser | 358/22 |
| 4,233,631 | 11/1980 | Mahler | 358/182 |
| 4,249,212 | 2/1981 | Ito et al. | 358/183 |
| 4,322,750 | 3/1982 | Lord et al. | 358/140 |
| 4,334,245 | 6/1982 | Michael | 358/183 |
| 4,360,831 | 11/1982 | Kellar | 358/182 |
| 4,400,719 | 8/1983 | Powers | 358/21 |
| 4,420,770 | 12/1983 | Rahman | 358/183 |
| 4,488,169 | 12/1984 | Yamamoto | 358/22 |
| 4,593,316 | 6/1986 | Kellar et al. | 358/140 |
| 4,602,286 | 7/1986 | Kellar et al. | 358/183 |

FOREIGN PATENT DOCUMENTS

| | | | |
|---|---|---|---|
| 0160549 | 11/1985 | European Pat. Off. | |
| 2000413 | 1/1979 | United Kingdom | |
| 2030419 | 3/1980 | United Kingdom | 358/105 |

OTHER PUBLICATIONS

R. Storey, et al., "Teletrack"-A Special Effect.
Moore, et al., SMPTE Journal, vol. 87:10:673-676.

Primary Examiner—John W. Shepperd
Attorney, Agent, or Firm—Ralph L. Mossino; John S. Bell

[57] ABSTRACT

A video special effects mixer including an improved recirculating frame store is disclosed. The mixer receives several inputs one of which is from the recirculating frame store and provides several outputs one of which goes to the recirculating frame store. The recirculating frame store includes two field recirculation loops and an interpolator. The real field is mixed with the previous interpolated recirculated field and the interpolated field is mixed with the previous real recirculated field. The output alternates between the two mixed fields. The recirculating frame store receives a key signal indicating relative gain, and has a key processor that reduces the gain of the recirculating key such that the combined gain is no more than unity.

33 Claims, 3 Drawing Sheets

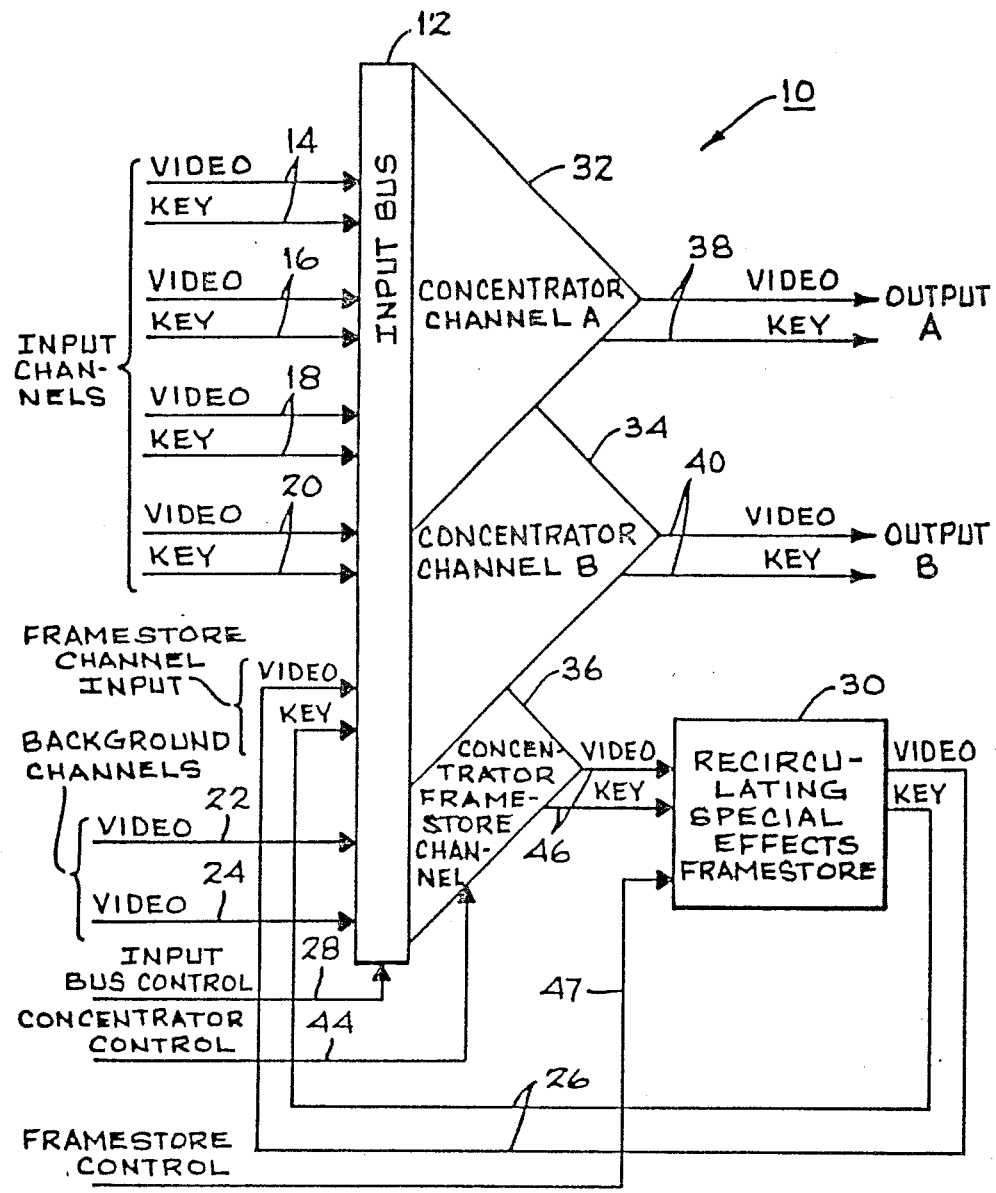
FIG_1

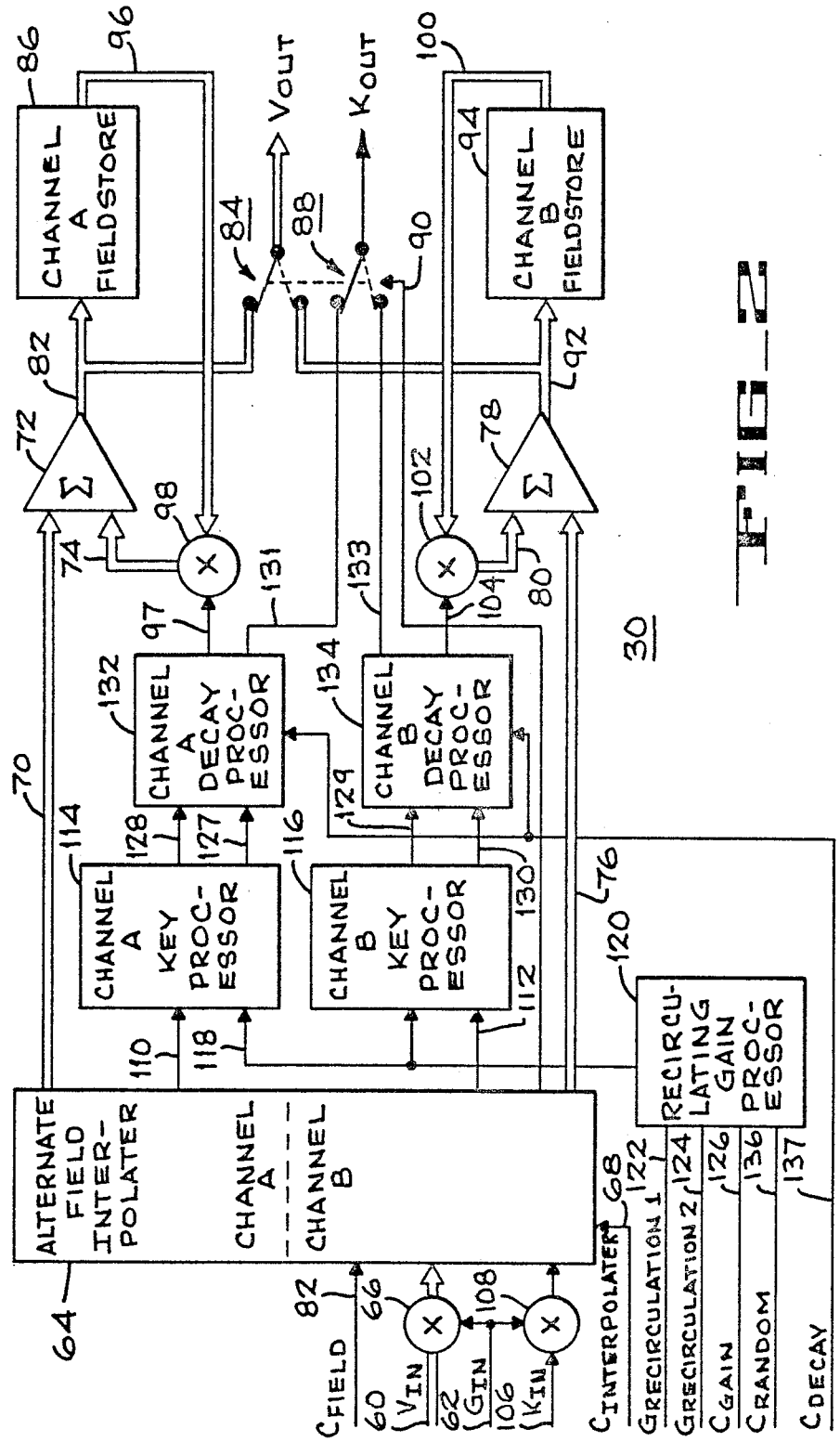
FIG_2

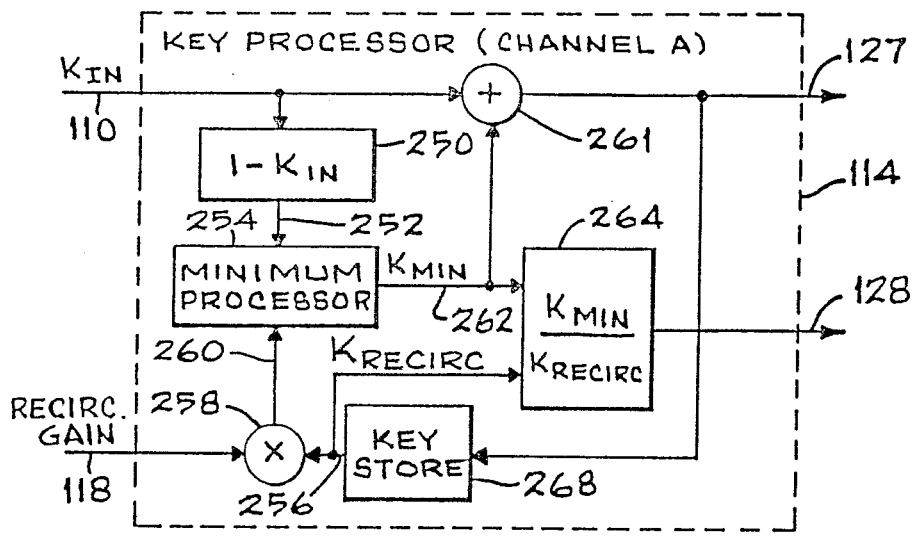
FIG_3
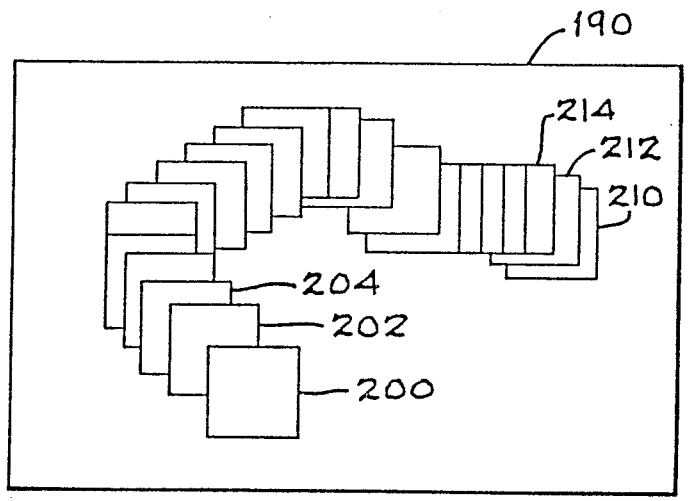
FIG_4
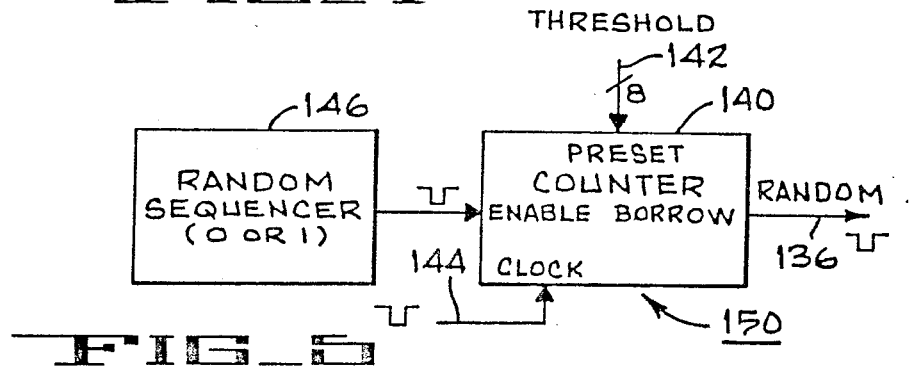
FIG_5

RECIRCULATING SPECIAL EFFECTS VIDEO FRAMESTORE

This is a continuation of copending application Ser. No. 07/195,370 filed on May 11, 1988 now abandoned, which is a continuation application and claims priority under 35 U.S.C. Section 120 of copending U.S. application Ser. No. 943,282, filed Dec. 8, 1986 now abandoned, which is the national stage application of a PCT application Ser. No. PCT/U.S.86/00733 filed in the U.S. Receiving Office on Apr. 11, 1986, and which is a continuation-in-part application of U.S. application Ser. No. 722,532, filed Apr. 12, 1985, now abandoned. Priority under 35 U.S.C. Section 120 is also claimed to copending U.S. application entitled, "Apparatus and Method for Processing Previously Processed Video Signals", Ser. No. 191,778, filed May 2, 1988, which is a continuation application of U.S. application Ser. No. 119,223, filed Nov. 3, 1987, now abandoned, which is a continuation application of U.S. application Ser. No. 851,195, filed Apr. 14, 1986, now abandoned, which is a continuation-in-part application of U.S. application Ser. No. 722,532, filed Apr. 12, 1985, now abandoned. The aforesaid U.S. national stage application Ser. No. 943,282 also spawned two divisional applications that are being abandoned in favor of this application, said divisional applications being Ser. No. 110,249, filed Oct. 19, 1987 and Ser. No. 109,990, filed Oct. 19, 1987 now abandoned.

This invention relates generally to the recirculation of video data through a video framestore to create a variety of special effects. This invention further relates to the combining of new video data with recirculating video data, on frame or alternate field interpolation basis. This invention further relates to the use of a recirculating frame store in a video combiner system.

BACKGROUND OF THE INVENTION

In composing a television production, there is an ever increasing need for variety of special effects. The phrase, special effects, is used to broadly define the selective altering and/or manipulating of video data to create a visual effect to attract the attention of the viewer. Special effects are used in a variety of video production situations.

There are a number of devices that create these special effects. Video switchers are one device that can produce special effects. The special effects produced by a video switcher are most commonly used while switching between video sources. Common switcher special effects include dissolves and wipes. An example of a video switcher that can produce a variety of dissolves and wipes is the AVC video switcher of Ampex Corporation.

Another device for producing special effects is the digital special effects system, such as the ADO digital special effects system of Ampex Corporation. Digital special effects systems can perform a number of special effects such as video frame enlargement and reduction, frame movement, frame rotation in 2 and 3 dimensions, and perspective manipulation. Each of these effects can be combined with other special effects to form even more complex effects.

The output from a digital special effects system commonly includes not only an output video signal, but also a corresponding key signal. The key signal indicates the level of the video signal, that is the ratio of the gain of the video signal relative to its original gain in the corresponding video signal. Key signals can be created by a variety of video devices.

There are two types of key signals. The first is a bi-state key signal, which simply indicates whether the corresponding part of the video signal is to be retained. If the corresponding part of the video signal is to be retained, the key signal has a value of one, and if it is not to be retained, then the key signal has a value of zero.

A more generally useful type of key signal is a linear key signal. Instead of having just two possible values, the linear key can have any value from zero to one. Thus, the value of a linear key can be used to partially reduce the level of a video signal. When viewed on a video monitor, a corresponding video image would exhibit a level of transparency corresponding to the value of the key signal.

The linear key is one method to allow two video signals to be added. If two video signals were simply added, their combined dynamic range would be twice the amount that could be handled by the video system. In order to add two video signals, their dynamic range must be reduced such that when added, their total dynamic range is equal to the maximum dynamic range or less. Processing the video signals with linear keys is one method to effect this dynamic range reduction.

A key signal is used to process a video signal. A video signal is processed by a key signal by multiplying the key signal with the video signal. Parts of a video signal which are processed with a corresponding part of a key signal which has a value of zero, will result in keyed video signal that has a signal level of zero. Conversely, when processed with a key signal of one, the keyed video signal will be left unchanged. When processed with some intermediate value of a linear key, the signal level of the video signal is reduced by that amount, effectively resulting in the video signal appearing transparent, if viewed on a video monitor.

Two or more keyed video signals can be combined only they have been processed by key signals totaling one or less. For example, if a first keyed video signal has been processed by a key signal of 0.5 and a second keyed video signal has been processed by a key of 0.4, the two keyed video signals could be combined, because the total of the key signals is 0.9, which is less than one. However, a video signal processed by a key of 0.5 cannot be combined with a video signal processed by a key of 0.6, because the total of the key signals would be 1.1, which is greater than one. In practice, a decision is not usually made on whether to combine video signals based on their associated keys, but rather key signals are adjusted so as to allow the combining of video signals.

An unfortunate problem associated with the sale of special effects machines is that the more often a particular effect is used, its novelty disappears and thus its ability to attract attention diminishes. Thus there is a constant need for new effects. Additionally, the larger the library of potential effects available to the operator, the less often the operator will need to call upon a particular effect. There is a need, therefore, for a variety of special effects.

Framestores have been used in the video industry for many years. A framestore is a memory device that can store one complete frame of video data. Framestores are commonly digital. Digital framestores allow manipulation of stored video data. Digital framestores are commonly used in digital special effects systems.

Framestores are typically configured to input a frame of video from one part of a system and output the frame to another part of the system. When a new frame of video is inputted to the framestore, the previous frame is completely overwritten.

A frame of video is actually composed of two interlaced fields of video. A frame of video contains a certain number of horizontal lines of video information (for example, 525 lines in the NTSC system used in the United States). Each field is composed of every other line which are interlaced to form a frame of video data. A frame of video is recorded by first recording one the fields and successively recording the other field. A typical time period between the recording of successive fields is one-sixtieth of a second (in NTSC system). If there is significant movement in the images of the video signal, there will be an annoying flicker when two fields are viewed as a video still frame. This can be a problem when such fields are combined in a framestore. One method to solve this problem is to use only a process called alternate field interpolation. Alternate field interpolation uses only one field of video from each frame and interpolates the second field from the first field. Because the second field is based entirely on the first field, there is no movement between fields in a frame. The disadvantage of this method is that one half of the video information is being thrown away. When there is little or no movement between fields, the entire frame should be used. Therefore, there is a need for a method and apparatus to prevent flicker when there is movement between two fields of a frame of video that makes use of the entire original frame.

It would be advantageous if the output of a framestore could be recirculated back through the framestore with the addition of new input frames. This would allow the combining of many frames of video to form an output signal. A number of special effects can be created by this recirculation, including blurs, smears, and trails, all highly desirable special effects. Such recirculation requires the ability to combine video signals. This ability to combine video signals requires the ability to manipulate video signals and associated key signals. Such a framestore would require key signal processing, storage and recirculating capability.

Another desirable special effect would be the ability to decay or selectively remove recirculated frames. Recirculated frames can be decayed in a variety of ways, including decaying in a preset order or in a random pattern. If decayed in some preset order, a method needs to be provided to determine the order of decay. If removed randomly, a method of generating the random decay needs to be provided.

While such a framestore could desirably be operated as part of many video systems, such as a switcher or digital special effects system, it could also be operated as a stand alone unit. A particularly desirable use is in conjunction with a video combiner or concentrator. A video concentrator is a device which selectively combines various video signals and their associated key signals to form one or more output video signals. An example of such a video concentrator, is the ADO Concentrator of Ampex Corporation. Because of the variety of input signals available, the video concentrator is an ideal location for a special effects frame store.

SUMMARY OF THE INVENTION

The present invention fulfills a need for providing a variety of special effects by use of a recirculating frame store using a variety of decaying methods. Additionally, the present invention provides for a selective method of preventing flicker between successive fields of video. The present invention, further, provides for the operation of a recirculating framestore as part of a video concentrator.

In accordance with the present invention, a video framestore is provided with a recirculation path that allows the output of the framestore to be combined with new input video the combined video being returned to the framestore for storage. The corresponding key signals for both the recirculated video and input video are processed along with the video and stored in a key framestore. This co-processing of key signals along with the video signals allows recirculation and combining of video signals. A number of control systems within the recirculating framestore system enable the creation of a variety of effects.

One control system used in connection with the present invention is a key signal gain processor. Such gain processors allow a uniform reduction in the gain of either the recirculated key signal or the input key signal. These key signals are used to further process the video signals that are being added to or recirculated in the framestore. The manipulation of these gain processors can define how recirculated video is combined with the new input video. Further, by setting the input gain to zero, no new video signal will be combined into the framestore, so that the video signals present in the framestore may be retained or decayed, but not be written over by new input video signals. Setting the recirculation gain to zero causes no video signal to be recirculated, and the framestore will thus be written over by input video.

Using just the gain processor, a still image or freeze frame can be created or input video signals can be passed through unaltered. Other effects can be created by adjustment of the gain processors.

An important aspect of a recirculating framestore is the manner in which recirculated video is decayed. Different methods of decaying video create different special effects. One method is not to decay the recirculating video signal at all. This creates the effect of the video images always writing over old images, when viewed on a video monitor. If there is movement in the video signal, a non-decaying trail is created.

Video frames can also be decayed by the above discussed gain processors. By setting the gain on the recirculated key to a value less than one, but greater than zero, recirculated images will fade on each recirculation until they disappear. The closer the gain is to zero, the faster the recirculated video will fade. Each image added to the framestore will decay at the same rate, but will be at different stages of decay, depending on when the image was added to the framestore. At any one time, the recirculated video might contain an image recently added as well as images added much earlier, and if the recirculated video was decayed by the gain processor, the images added to the framestore earlier will be more transparent than those added more recently, if viewed on a monitor.

Another control system to decay recirculating video uses the key signal decayed over time. The recirculating key signal is decayed by the gain processor in the selected manner. However, the key signal is not allowed to process the video signal, and the output key signal is maintained at a value of one and does not reflect the diminishing value of the key signal. When the key signal associated with a particular image reaches a predetermined bottom threshold value, the key signal is set to zero. The zero key value is then used to process the video signal and is outputted as the key signal. The effect of this timed decay is that as an image is moved and it leaves a trail of old images; each old image disappears after a gradual decay, in the order in which it was added to the frame store. If the images being added are smaller than the boundaries of the frame of video, the effect created appears something like the movement of a centipede, when viewed on a monitor. As new images are added to the front of the trail of images, the oldest images are one by one disappearing off the back, creating a desirable special effect.

To create another effect, either of two preset gain values are applied to the gain processor instead of a uniform value being applied. This requires a recirculating gain control generator which upon receiving a random signal, selects either of the two possible gain values. The effect thus created causes different parts of recirculated images to randomly decay at two different rates. The effect resembles the twinkling of stars at night.

The random signal generator used to create the random control signal uses a random sequencer rather than a random number generator. A good random number generator is difficult to produce. The random sequencer, which produces a random two state signal, is easier to implement and produces a more truly random output. This two state output is used in conjunction with a presetable counter. The preset on the counter is used to determine a threshold level. By adjusting the threshold level, the frequency of the gain control signal can be controlled.

The present invention provides for a method of solving the inter-field flicker problem by modification of alternate field interpolation. In traditional alternate field interpolation, only one of each pair of fields is actually used. The present invention actually splits the framestore and its video and key recirculation paths into two channels, one for each field of video. These two channels are completely recirculated during the period each field is received, instead of being recirculated once during the period a full frame is received.

Thus when the first field is being processed, an interpolated second field is being processed at the same time. Normally one field is processed at a time. This processing at the field rate maintains the resolution of a non-interpolated signal, while eliminating inter-field frame flicker.

An ideal location for such a recirculating framestore is as part of a video concentrator. By its nature, the recirculating framestore must have access to key as well as video signals. In a video concentrator, all the needed signals are available. Further, the effectiveness of the special effects is enhance by a number of possible input images, including multiple-image images that can be created by the concentrator. The concentrator also allows the output of the recirculating frame store to be combined with other signals being outputted.

Various of the above-mentioned and further features and advantages will be apparent from the specific examples described hereinbelow of an exemplary apparatus and method.

BRIEF DESCRIPTION OF THE DRAWINGS

FIG. 1 is a schematic representation of components of a concentrator utilizing a recirculating special effects framestore in accordance with this invention.

FIG. 2 is a schematic representation of a recirculating special effects framestore in accordance with the present invention.

FIG. 3 is a schematic representation of a key processor in accordance with the present invention.

FIG. 4 is a representation of an output frame of video of a recirculating special effects framestore view on a video monitor.

FIG. 5 is a schematic representation of a random signal generator in accordance with this invention.

DETAILED DESCRIPTION

FIG. 1 is an illustration of a typical video concentrator 10. An input bus 12 receives the various input signals and routes them to other parts of the concentrator according to control signal 28. Input channels 14, 16, 18, and 20 input both a video signal and a key signal. The video signal is an unkeyed video signal, which is a video signal that has not been processed by its corresponding key signal. The key signal accompanies the video signal as an indicator of the gain processing to be performed within the concentrator. The source of these input channels may be a number of video devices, such as switchers or digital special effects system. While four input signal pairs are shown, it is understood that any number of input channels would be allowable.

There are preferably two background channels 22 and 24. These channels are video signal only inputs that usually provide a color background, although any video signal can be used. Background channels 22 and 24 are used to fill in the areas of the output frame that do not contain keyed video signals. In areas where the linear key is greater than zero but less than one, the background is added to make the value total key signal equal to one. As with the input channels, any number of background channels are allowable.

The other input signal on input bus 12, is a framestore channel input 26. Framestore channel input 26 contains both a keyed video signal and an associated key signal, indicative of the key processing already performed on the video signal. Framestore channel input 26 is the output of recirculating special effects framestore 30.

Input bus 12 routes the various signals to three concentrator channels 32, 34 and 36. Control signal 28 determines which signals are passed to which channel. Control signal 28 is derived from operator inputs at a control panel.

The three concentrator channels 32, 34, 36 receive input signals from input bus 12 according to control signals 28. Concentrator channel A, 32 and concentrator channel B, 34 preferably are identical channels. Both channels A, 32 and B, 34, can accept any combination of input channels, 14, 16, 18 and 20, or framestore channel 26, and combine them according to concentrator control signals 44. Background channels 22 and 24 can only be routed to concentrator channels 32 and 34. Because the output of the framestore 30 must be outputted through one of the other concentrator channels, there is an opportunity to add a background signal at that stage.

The output of concentrator channels A and B, 32 and 34, are output signals 38 and 40. Output signals 38 and 40 both have a video signal and a key signal. Once again, the key signal is indicative of the previous key processing. The output of concentrator framestore channel 36, is a concentrator framestore channel output channel 46, which contains both a video and key signal inputted to recirculating special effects framestore 30.

In operation, signals are selected of input bus 12 and are fed to each of the concentrator channels, 32, 34 and 36. As an example, concentrator channel A, 32, receives two input channels, 14 and 16, and a background channel 22. The concentrator control signals 44 dictate that input channel 14 should have priority over input channel 16. The video signals of input channel 14 and 16 are processed and combined accordingly, and then keyed into background channel signal 22 to form a channel A output signal 38.

Continuing the above example, input channels 18 and 20 are fed into concentrator framestore channel 36. Input channels 18 and 20 are combined and outputted to the recirculating framestore 30. In framestore 30, new images are combined with old recirculated images according to framestore control signal 47 and outputted to frame store channel input 26 as a video and key signals. Framestore channel input 26 is fed to the input bus 12, and in turn fed by the input bus 12 to concentrator channel B, 34. Background channel 22 is also fed to concentrator channel B, 34, where it is added as background to the framestore channel input 26. The result is outputted as channel B output signals 40. These signals can then be fed to any video utilization device, such as a monitor, video tape recorder, or broadcast system.

In the above example, the routing of signals was arbitrarily chosen to illustrate a typical operation of the concentrator. The operator has complete control over a large number of potential routings of signals.

Next, the operation of the recirculating framestore 30 will be discussed. While the framestore 30 is preferably located within a video concentrator, it is clear that it could operate with numerous video systems and as a self contained system.

Referring now to FIG. 2, recirculating framestore 30 is shown. In FIG. 2 there are three types of signals which are routed about the recirculating framestore 30. They are video signals, which are shown as double bus lines, key signals, and control signals. If this system is digital, which is the preferred embodiment, the video and key signals are binary signals.

Both video and key signals are recirculated. The video follows a relatively simply recirculation path and will be discussed first. Input video signal 60 can originate from a variety of video devices. If framestore 30 is part of the concentrator 10 of FIG. 1, then input video signal 60 will originate in concentrator framestore channel 36 as output signal 46.

Input video signal 60 is fed to video gain processor 66 where it is processed with input gain signal 62. Input gain signals are numbers between zero and one, and input gain signal 62 specifies the amount of gain reduction to impose on input video signal 60. Input gain signal 62 preferably is generated by a control system from operator input. Video gain amplifier 66 can be implemented as a simple digital multiplier available in integrated circuit packages.

The output of video gain processor 66 is fed into alternate field interpolator 64. Interpolator 64 operates in two modes. The first mode is used where there is little or no movement between fields of video. In this mode no interpolation takes place. The second mode is used when there is movement between the fields of video. The operating mode is determined by interpolator control signal 68. This signal preferably is generated by the control system from operator input. When the operator notices a flicker in the output signal displayed on a video monitor, the operator sets this signal to the second mode.

If automatic generation of the interpolator control signal 68 is desired, input video signal 60 can be monitored by a motion detector in a well known manner. Such a motion detector will set the interpolation control signal 68 to the second mode whenever motion greater than a selected threshold amount is detected.

Interpolator 64 has two channels, A and B. Channel A receives video field one, and channel B receives video field two. Channel A outputs an input channel A video signal 70 to a channel A video combiner 72, where it is combined with a recirculating channel A video signal 74. Channel B outputs an input channel B video signal 76 to a channel B video combiner 78, where it is combined with a recirculating channel B video signal 80.

If interpolator 64 is operating in the first mode, corresponding to a condition of no movement or flicker, then interpolator 64 acts as a routing device. According to a field control signal 82, the input video signal from video gain processor 66, is fed to either channel A or B for output as either input channel A video signal 70 or input channel B video signal 76. Field control signal 82 is generated by the control system and indicates whether the current field being received is the first or second field of the video frame.

If interpolator 64 is operating in the second mode, alternate field interpolation is occurring. When field control signal 82 indicates that the first field is being inputted, the input video signal is outputted directly on channel A as input channel A video signal 70. From the first field video signal, a second field video signal is interpolated and outputted by channel B as input channel B video signal 76. The process of alternate field interpolation is well known to those skilled in the art. When field control signal 82 indicates that the second field is being inputted, the input video signal is outputted directly on channel B as input channel B video signal 76. From the second field video signal, a second field video signal is interpolated and outputted by channel A as input channel A video signal 70.

Input channel A video signal 70 is combined with recirculating channel A video signal by channel A video combiner 72. In the preferred embodiment, video combiner 72 is implemented as a digital adder, which is available as an integrated circuit. Channel A video combiner 72 outputs an output channel A video signal 82. Output channel A video signal 82 is fed to both output video switch 84 and channel A fieldstore 86.

Output video switch 84 is operated in tandem with output key switch 88. Both switches are operated by output field select signal 90. Output field select signal 90 is generated by interpolator 64 based upon field control signal 82. The switch positions are alternated corresponding every field of video to form a standard video signal. The output of video switch 84 is the output of framestore 30. If the framestore 30 is located in the concentrator 10 of FIG. 1, the output video signal is part of the framestore input channel 26.

Input channel B video signal 76 is combined with recirculating channel B video signal by channel B video combiner 78. Video combiner 78 is the same as channel A video combiner 72. Channel B video combiner 78 outputs an output channel B video signal 92. Output channel B video signal 92 is fed to both output video switch 84 and channel B fieldstore 94.

Output channel A video signal 82 is also fed into the channel A fieldstore. Video signals are constantly being read in and out of fieldstore 86. Each pixel of video data remains in the fieldstore for the time duration of one field of video. Fieldstore 86 outputs recirculating channel A video signal 96, which is fed to video gain processor 98. Video gain processor 98 is the same as the input video gain processor 66. Recirculating channel A video signal 96 is processed with a channel A key signal 97. The derivation of this key signal will be discussed below. The output of channel A gain processor is fed into channel A video combiner 72 and combined with video signal 70 to produce video signal 82 which is recirculated back through the fieldstore 86.

The channel B video recirculation path is identical to channel A. Output channel B video signal 92 is also fed into the channel B field store. Fieldstore 94 outputs recirculating channel B video signal 100, which is fed to video gain processor 102. Video gain processor 102 is the same as video gain processors 66 and 98. Recirculating channel B video signal 100 is processed with a channel B key signal 104. The derivation of this key signal will be discussed below. The output of channel B gain processor is fed into channel B video combiner 78 and combined with video signal 76 to produce video signal 92 which is recirculated back through the fieldstore 94. This completes the input and recirculation paths for the video signals in recirculating framestore 30.

The path of the key signals will be discussed next. Input key signal 106 indicates the previous processing of input video signal 60. Because input video signal 60 is directly processed with input gain signal 62, input key signal 106 is also processed with that signal so that it will remain indicative of the processing of input video signal 60. Input key signal 106 is processed by input key processor 108. Input key processor can be implemented as a digital multiplier. The output of input key processor 108 is fed into interpolator 64.

Interpolator 64 does process the input key signal 106 in the same manner that the input video signal 60 is processed. Key signals that correspond to the first field are routed to channel A and outputted as input channel A key signal 110. Key signals that correspond to the second field are routed to channel B and outputted as input channel B key signal 112. Input channel A and B key video signals, 110 and 112, are fed to channel A and B key processors, 114 and 116, respectively.

Each of the channel A and B key processors, 114 and 116, actually is a combination key processor, key loop, and key store. Another input to key processor 114 and 116 is recirculation gain 118. The derivation of recirculation gain 118 will be discussed below. To the key processor 114 and 116, recirculation gain 118 is used to process an internal recirculating key signal.

Referring to FIG. 3, the channel A key processor 114 is shown. It is understood that the channel B key processor 116 is identical. Inside the key processor 114, the input key signal 110 is subtracted from one by the 1-$K_{IN}$ processor 250 to form a remainder key signal 252. The remainder key signal 252 represents the amount of key signal not used by the input video signal 70 of FIG. 2. The 1-$K_{IN}$ processor 250 can be implemented, for example, as an inverter and digital adder. The output of the 1-$K_{IN}$ processor 250 is fed to a minimum processor 254.

A recirculation key signal 256 represents the key signal used by the video currently in the channel A field store 86 of FIG. 2. The recirculation key signal 256 is processed with the recirculation gain signal 118 by key signal processor 258. Key signal processor 258 is identical to key signal processor 108. The resulting signal is the processed recirculation key signal $K_{RECIRC}$, 260, which is fed to minimum processor 254 with remainder key signal 252.

Minimum processor 254 determines the minimum of the key signals input thereto and outputs the signal as minimum key signal $K_{MIN}$, 262. Minimum processor 254 can be implemented as a digital comparator. The output of minimum processor is fed to both key signal adder 266 and ratio processor 264.

Ratio processor 264 determines the ratio of the minimum key signal $K_{MIN}$, 262, to the processed recirculation key signal $K_{RECIRC}$, 260, to form the recirculating channel A key signal 128. Ratio processor 264 can be implemented as an arithmetic processor integrated circuit, but is preferably implemented as a look-up table in a ROM memory.

The output key signal 127 is also fed to an internal key store 268, from which it is outputted as the recirculation key signal 256. Key store is simply a memory array of the same number of pixel locations as the channel A field store 86.

The key processor 114 also outputs the sum of the minimum key signal 262 and the input key signal $K_{IN}$, 110, as the recirculating channel A output key signal 127.

Referring again to FIG. 2, key processor 114 is designed to allow input video 70 to use as much of the available signal gain is it needs. It is said to have priority over the recirculating video 96. All of the remaining gain is available to the recirculating video 96. If necessary, the recirculating video 96 is processed down to the level of the remaining key space. If the recirculating video 96 can use all the remaining gain, then the output key signal 127 is one. However, if the recirculating video 96 has already been reduced, or will be reduced by the recirculation gain signal 118 to a level less than the remaining gain, then recirculating channel A key signal 128 will be at that level and the output key signal 127 will represent the total of the input key signal 110 and the minimum key signal 262 (FIG. 3), which will be less than one. Video signals that have been reduced in gain have lost information because these signals exist in only limited resolution. Thus when they are reduced, they lose resolution and if increased in gain, they will not reproduce their original values. Thus video signal preferably are only reduced in gain, and not generally increased.

The recirculating channel A and B key signals, 128 and 130 fed to channel A and B decay processors, 132 and 134, whose function will be explained below. If not activated, decay processor 132 and 134 pass their input signals unaffected. Thus recirculating channel A and B key signals are outputted as channel A and B key signals 97 and 104.

The channel A and B output key signals 127 are also fed to channel A and B decay processors 132 and 134, and also pass unaffected if decay processors 132 and 134 are not activated as channel A and B key output signals, 131 and 133. The channel A and B key output signals, 131 and 133, are fed to key switch 88. Key switch 88 is operated in tandem with video switch 84. The output of key switch 88 is the output of framestore 30. If the framestore 30 is located in the concentrator 10 of Figure one, the output key signal is part of the framestore input channel 26.

The recirculation gain signal 118, used by both key processors, is generated by recirculating gain processor 120. Recirculating gain processor 120 operates in two modes. These mode are selected by gain control signal 126, which is generated by the control system, preferably from operator input. In the first mode, recirculating gain processor 120 outputs recirculating gain 1, 122, and outputs it as recirculation gain signal 118. This is considered the normal operating mode.

In the second mode, recirculating gain processor 120 receives a random control signal 136. This two state signal is generated by a random signal generator 150 of FIG. 5, to be discussed below. The random control signal 136 selects either recirculation gain 1, 122, or recirculation gain 2, 124, as recirculation gain signal 118.

Decay processors 132 and 134, when activated, output key signals having a value of one regardless of their input signals, unless their input key signals are under a low threshold level, when they output signals of zero. The purpose of this processing will be discussed below.

This completes the discussion of the interconnection of the elements of FIG. 2. Next, the operation of FIG. 2 will be explained.

The operation of recirculating framestore 30 is best understood within a typical example. The goal of this example is to create a special effect called a trail. A trail is illustrated in FIG. 4. FIG. 4 is a representation of a video signal viewed on a video monitor. A size reduced frame 200 is moved from a starting location 210 to a final location 200. As it moves along the path, it leaves old reduced frames such as 210, 212, 214, 204 and 202.

In this example, the input video 60 (FIG. 2) comprises a size reduced frame of video in an otherwise empty full frame 190. Such a video signal can be created by a digital special effects system which is capable of reducing a video signal and positioning it within a full frame of video. If reduced frame 210 were not partially obscured by reduced frame 212, and reduced frame 210 were the only reduced frame in full frame 190, then FIG. 4 would be a representation of input video signal 60. It should be assumed that frame 210 contains a video picture, such as a field of flowers or a news anchorman reading the news. Over a period of time, the frame of active video is moved in relation to the full frame of video. Frame 210 follows the path shown by the other boxes in the full frame on the video monitor. Unlike FIG. 4, which actually represents the desired trail effect to be created by the recirculating framestore 30, input video 60 does not leave a trail, but rather only one frame is visible at any one time. The moving frame starts at the location of frame 210, and follows the path shown and stops at the location of frame 200.

Input key signal 106 (FIG. 2) is created with input video signal 60 and has a value of one where it corresponds to the reduced frame 200 and a value of zero elsewhere. In this example, both the input gain signal 62 and recirculating gain signal 118 are set at one. However, the effects of changing these signals will be discussed below. For this example, it is also assumed that fieldstores 86 and 94 start empty.

Framestores are commonly said to recirculate at frame rate. This means that the contents of the framestore, one frame (two fields) of video, recirculates once in the time it takes a new frame to be inputted. Because framestore 30 is actually composed of two field stores and recirculation paths, framestore 30 can be recirculated at field rate. This means that the contents of the framestore 30 are completely recirculated in the time it takes to input a new field. It is this doubled rate that allows every-field interpolation by the interpolator 64. Operation of interpolator 64 on the luminance and chrominance components of the input video signal 60 is described in two sections of Ampex manual by David Trytko, one of the present inventors, entitled "ADO Infinity-Target Framestore System—System Theory and Operation". A copy of these sections are attached hereto as Appendix.

The input video signal 60 and input key signal 106 pass unaffected by processors 66 and 108, because the input gain signal 62 in this example, is set to one. If interpolator 64 is off, the first field of video and key are set to channel A. Nothing is sent to channel B. Anything recirculating in channel B is allowed to recirculate without additional material. The second field of video and key are sent to channel B and nothing is sent to channel A.

If interpolator 64 is on, then as field one of video and key is routed to channel A, an interpolated second field of video and key is sent out on channel B. When the real second field is encountered, it is sent out on channel B and an interpolated first field of video and key is sent out on channel A. This alternating interpolation allows the fieldstores to be updated with new material every field, instead of every frame, producing improved picture quality in the resulting video image.

The common method of alternate field interpolation in prior art devices would be to receive the first field and video and pass them on channel A and send nothing on channel B. Upon receiving the second field, the second field is discarded and a new second field of video and key is interpolated from the first field and sent out on channel B. Nothing is sent out on channel A. When the interpolator is off, the field stores are only updated with new material every frame. This preserves the full resolution of the original frame of video. Under the common method of interpolation, one of the fields in a frame is discarded in favor of an interpolated field so as to eliminate inter-field flicker. Interpolator 64 uses both fields in the frame to interpolate, and reduce or eliminate flicker. By using both fields and updated on field basis, there is no loss of resolution as compared to the more common method of alternated field interpolation.

The channel A input video signal 70, after leaving interpolator 64, is combined with the channel A recirculating video 74. Before being combined with the channel A input video, recirculating video 74 must be processed with the output of the key processor 114. For this first frame of video, the fieldstore 86 was defined as being empty. Thus the output of the framestore 30 is the input video signal. The input video signal 70 is stored in fieldstore 86 and the input key signal 110 is stored in key store 268 (FIG. 3). The second field of video and key is processed in the same manner.

For the sake of this example, it will be assumed that the second frame of input video contains the size reduced frame of video now moved from position 210 in FIG. 4 to position 212. The input video signal 70 is passed normally to video combiner 72. The input key signal 110 is also passed to key processor 114.

Referring to FIG. 3, the input key signal 110 defines the area of reduced frame 212 in FIG. 4. The key signal 110 is subtracted from one to form the remainder key signal 252, which indicates what key signal space is available to the recirculating video. Key store 268 contains the key signal from the first frame, which defines the area of reduced frame 210 in FIG. 4. Because the recirculation gain 118 is defined as one for this example, the minimum processor 254 determines the minimum between the recirculating key signal and one minus the input key signal. There are three areas of interest in this determination.

First is the area outside both reduced frames 210 and 212 of FIG. 4. In that area of the key signal the minimum value $K_{MIN}$ is zero because the recirculating key signal 260 is zero and the key signal on line 252, $1-K_{IN}1$. The next area of interest in the key signal is the area of the second reduced frame 212 (FIG. 4). Note that this frame partially obscures the first frame 210. This frame is part of the input key signal and, by design, it has priority over any image being recirculated. It should be noted that key processor 114 could easily be designed such that recirculated key signal would have priority over input key signals. In the area defined by the input key signal for the second frame, the minimum processor 254 outputs zero on the line 252. The third area is the area of the first reduced frame that is not obscured by the reduced frame 212 (FIG. 4) in the second input frame. This can be seen as the backward "L" shaped area labelled 210 in FIG. 4. Both input signals to minimum processor 254 have this area of the key signal at one. Thus the minimum key signal 262 only defines this backward "L" shaped area.

The minimum key signal 262 is added by adder 261 to the input key signal 110 to form the key signal 127 from which the output key signal 131 is formed and to form the recirculation key signal to be stored in the key store 268. This key signal indicates the area of interest in the output key signal is the combined area of the first and second input keys signals defining the two overlapping reduced frames of video, 210 and 212.

The ratio of the minimum key 262 and the recirculating key 260 is the key 128, which becomes the channel A key signal 97. The ratio is used to determine how to process the recirculating video signal to a desired level while taking into account the previous processing of that video signal. The channel A key signal 97 is used to process the recirculating video 96. Recirculating video 96 contains the reduced frame 210 (FIG. 4) from the first output frame. After being processed by the channel A key signal 97, the recirculating video signal is no longer the full reduced frame 210 (FIG. 4) but rather an "L" shaped area of video. When added to the input video signal 70, an output video signal 82 is formed which is a video signal in the shape of two overlapping reduced frames, 210 and 212. This video signal is also sent to the fieldstore 86, to be used as the recirculated video signal for the next input frame. The above discussion has been restricted to channel A for the sake of clarity. It is clear that it applies equally to channel B and the second fields.

Referring to FIG. 4, frame 210 is referred to as a trail. As frames are added, the same process occurs until the end of the motion with frame 200 as the final frame. Each new frame would obscure a portion of the previous frame, yielding a full frame 190 as shown in FIG. 4. The trail is a basic special effect of the recirculating framestore 30. Other special effects may be described as variations on the trail effect. The following will discuss the effects of changing the control signals.

Changing the input gain signal 62 to a value less than one causes the new frames to have a transparent look. If the frame is not moved, then a number of input frames must be to added on top of each other to form frame of full intensity. Because even an apparently still picture contains a slight amount of movement of the originating camera, the image becomes blurred wherever movement occurs producing a desirable special effect. If the frame is moving, then the image smears, which is also considered a desirable effect. If the input gain signal 62 were set to zero, no new video would be added to the recirculation path. If the recirculation gain 118 was set to one at the same time a freeze effect would be created.

Changing the recirculation gain 1, 122, causes a decaying of old images. Each old image would become more transparent until it finally disappeared. The more times a particular image is recirculated the more its key signal is reduced. If the added images are moved while being added, a very pleasing trail that resembles the tail of a comet, is created.

There are two other systems within the recirculating framestore 30 to create special effects. The first is the decay processors and the second is the recirculating gain processor.

The special effect created by the decay processors 132 and 134 uses the recirculating key signal 260 (FIG. 3), in key processors, 114 and 116, as a collection of down counters. The recirculating key signal is decayed normally by the recirculating gain signal 118, but the recirculating key signals are not allowed to decay the recirculating video signals, 96 and 100, or output key signals, 127 and 129. The recirculating video signals 96 and 100 are processed with a gain of one and the output key signal is outputted at one. This effect, referring to FIG. 4, allows the old frame images to remain at full intensity but each old frame image instantaneously disappears in the order they were added as their key values go below a lower threshold value. The effect looks something like the movement of a centipede.

To accomplish this effect, decay processors 132 and 134, when activated, output a key signal of one, regardless of their input, unless their input is below the low threshold, when they output zero. The low threshold value is necessary because the key signal will never actually reach zero as it is always multiplied by an amount which only reduces its value.

The other effect system is the recirculating gain processor 120. Recirculating gain processor 120 is activated by gain control signal 126. Unless activated, recirculating gain processor 120 passes recirculating gain one, 122, unchanged. When activated, it passes either recirculating gain 1, 122, or 2, 124, depending on the state of random control signal 136. Both recirculating gain 1 and 2 are generated by the control system from operator input. For a maximum effect, these two values should be relatively different in value, although they could be set to any values. The effect created by this two-rate decay is a sort of twinkling of the trail, similar to the twinkling of stars at night.

While a random control signal can be created in a variety of ways, the preferred method is shown in FIG. 5. The control random signal 136 is the carry signal of up counter 140. The frequency of the control random signal 136 is determined by the present input 142 of counter 140. The larger the preset, the more frequently the random control signal 136 will be issued. The pulses used to increment the counter are supplied to the clock input 144 of the counter. The frequency of the clock pulses should be at the rate of digital sampling of the system, that is the rate the pixels move through the system. The random factor is created by random sequencer 146, which randomly outputs either zero or one into the enable the counter 140. The effect of this arrangement is that the counter 140 counts down from the preset 142 only when enabled by the random sequencer 146. Counter 140 can be implemented as a simple digital up counter. Random sequencer can be implemented as a white noise generator with a threshold output.

In summary, the recirculating framestore can be adjusted by a variety of control signals and system to create a variety of special effects. When there is movement between consecutive fields of video, the framestore can operate in an interpolation mode. The interpolator interpolates every field as opposed to every frame, to reduce or eliminate flicker. The recirculating framestore can operate in many video devices and even as a stand alone device, but is preferably situated in a video concentrator, which acts as a ideal input and output system for the framestore.

While the embodiments disclosed herein are preferred, it will be appreciated that they are merely examples, and that various alternatives, modifications, variations or improvements thereon may be made by those skilled in the art from this teaching, which are intended to be encompassed by the following claims.

What is claimed is:

1. Apparatus for selectively combining video signals to generate a video effect, comprising:

processing means responsive to an input video signal, an input key signal indicating the level for said input video signal, a recirculated video signal and a recirculated key signal indicating the level of said recirculated video signal, for generating an output key signal having a value determined by values represented by said input key signal and said recirculated key signal, for generating a recirculated video processing key signal having a value determined by values represented by said input key signal and said recirculated key signal for adjusting the level of said recirculated video signal in accordance with the value of said recirculated video processing key signal, and for combining said input video signal with said level adjusted recirculated video signal to generate an output video signal embodying said video effect; and recirculation means coupled to said processing means for receiving said output video signal and said output key signal, and for storing both said output video signal and said output key signal for a predetermined interval and, then for outputting said stored output video signal to said processing means as said recirculated video signal and for outputting said stored output key signal as said recirculated key signal.

2. The apparatus of claim 1 wherein said processing means generates said output key signal to have a value representative of the level of said output video signal.

3. The apparatus of claim 2 further comprising signal gain adjustment means coupled to said processing means and responsive to a control signal for altering the values of said output key signal and said recirculated video processing key signal according to the value of said control signal.

4. The apparatus of claim 3 further comprising means for selectively randomly altering the value of said gain control signal.

5. The apparatus of claim 3 further comprising means coupled to said processing means to receive said recirculated video processing key signal for reducing the value of said recirculated video signal to zero when the value of said recirculated video processing key signal is less than a selected threshold 6. The apparatus of claim 5 further comprising signal combining means having a plurality of video and key signal input pairs and a plurality of video and key signal output pairs, one of said video and key signal input pairs being coupled to receive said output video signal and said output key signal, respectively, from said processor means, and one of said video and key output pairs being coupled to supply said input video signal and said input key signal, respectively, to said processor means, said signal combining having an input for receiving a combination control signal determining the coupling of input video signals to video outputs, said signal combining means for combining the video signal from selected ones of said video inputs determined by said combination control signal in accordance with the corresponding key signals received at the corresponding key signal inputs of said input pairs, and for outputting the combined video signal at a selected output, where each said output may have as an output video signal a different combination of selected input video signals, and for outputting at each said key signal output a key signal having a value indicative of the level of the combined video output signal at the corresponding video output.

7. An apparatus for combining sequentially received field A and field B input video signals which together define a frame of video signals with field A and field B recirculated video signals to generate a frame of output video signals, comprising:

means for receiving a said field A input video signal during a field A interval and for simultaneously interpolating from said field A input video signal a field B interpolated video signal, and for receiving a said field B input video signal during a field B interval and for simultaneously interpolating from said field B input video signal a field A interpolated video signal;

means for combining, during said field A interval, said field A input video signal and a said field A recirculated video signal and for combining, during said field A interval, said field B interpolated video signal with a field B recirculated video signal to generate, respectively, a field A combined video signal and a field B combined video signal, and for combining, during said field B interval, said field B input video signal and a said field B recirculated video signal and for combining, during said field B interval, said interpolated field A video signal with a field A recirculated video signal to generate, respectively, a field B combined video signal and a field A combined video signal; and means for separately storing said field A and field B combined video signals and for outputting, after predetermined delays for each of said field A and field B combined video signals, said stored field A and field B combined video signals as, respectively, said field A recirculated video signal and said field B recirculated video signal.

8. The apparatus of claim 7 further comprising:

first means for receiving a field A and a field B input key signal corresponding, respectively, to said field A and field B input video signals, said field A and field B input key signals indicating the level of the corresponding field A and field B input video signals, and for receiving field A and field B recirculated key signals indicating the level of said corresponding field A and field B recirculated video signal, and for generating in response thereto a new field A recirculated key signal, a new field B recirculated key signal, a field A recirculated video processing key signal and a field B recirculated video processing key signal;

second means coupled to said first means and responsive to said field A and field B recirculated video processing key signals to process, respectively, corresponding said field A and field B recirculated video signals prior to combination of each said field A and field B recirculated video signal with corresponding field A and field B input video signals; and third means coupled to said first means for storing said new field A and field B recirculated key signals for use, respectively, as said field A and field B recirculated key signals.

9. The apparatus of claim 7 wherein said field A and field B input video signals and said field A and field B combined video signals and said field A and field B recirculated video signals each comprise a frame of video signals, where each said frame is comprised of a plurality of horizontal scan lines defining a raster, and wherein each said raster is divided into a field A of horizontal scan lines having a first set of locations on said raster and a field B of said horizontal scan lines occupying a second set of locations on said raster so as to be interlaced or interdigitated with said field A scan lines, and where each said horizontal scan line is comprised of a plurality of pixels, and each said pixel is defined in picture content by a corresponding data sample, and further comprising key processing means coupled to receive field A and field B streams of digital data samples defining a plurality of field A and field B input key signals, and coupled to receive field A and field B recirculated key signal data streams, for performing predetermined mathematical processing on each said field A and field B input key signal data sample using a corresponding field A or field B recirculated key signal data sample, said mathematical processing being performed in synchronism with receipt of the corresponding field A or field B input video signal data sample, and for generating a corresponding stream of field A or field B output key signal data samples from said mathematical processing operations, and for generating a corresponding stream of field A or field B recirculated video processing key signal data samples from said mathematical processing operations, and wherein each said data sample of said field A and field B recirculated video signals corresponds to a data sample of the corresponding field A or field B recirculated video processing key signal data streams, and further comprising recirculated video signal level adjustment means coupled to receives said field A and field B recirculated video signal data samples and coupled to receive said field A and field B recirculated video processing key signal data samples, and for adjusting the level of each said data sample of said field A and field B recirculated video signals with the corresponding field A or field B recirculated video processing key signal data sample, and further comprising keystore means coupled to receive field A and field B output key signal data samples and for storing each said data sample for an interval equal to one frame interval and then for outputting each said stored output key data sample as a field A or field B recirculated key signal data sample, as appropriate and in synchronism with the receipt of the corresponding field A or field B input key signal data sample for the corresponding pixel in the next frame.

10. The apparatus of claim 8 wherein said first means further comprises means for performing said mathematical operations such that the difference between a nominal value and each said input key signal is computed to determine a key space available key signal for each said input key signal, and further comprises minimum detection means for receiving said recirculated key signal corresponding to each said input key signal and for receiving the corresponding one of said key space available key signals, and for selecting and outputting the smaller of said key space available key signal or said recirculated key signal as a minimum key signal for each said input key signal, and further comprising means for receiving said minimum key signal for each said input key signal and said corresponding recirculated key signal and for calculating a recirculated video processing key corresponding to each said input key signal as a fraction having said minimum key signal as the numerator and said recirculated key signal as the denominator, and further comprising means for adding said input key signal to said minimum key signal to generate a recirculated key signal for storage and later recirculation for each said input key signal, and further comprising means for storing said recirculated key signal for an interval equal to one frame of said input video signals and for outputting said stored recirculated key signal as said recirculated key signal simultaneously with the receipt of a new corresponding input key signal for the next frame of said input video signals.

11. The apparatus of claim 10 further comprising means coupled to receive said field A recirculated video signal and said field B recirculated video signal and coupled to receive said field A recirculated video processing key signal and said and field B recirculated video processing key signal, for adjusting the level of said field A recirculated video signal in accordance with the value of the corresponding field A recirculated video processing key signal, and for adjusting the level of said field B recirculated video signal in accordance with the value of the corresponding field B recirculated video processing key signal.

12. The apparatus of claim 9 wherein said key processing means comprises field A and field B key processor means, each said field A and field B key processor means comprising a minimum processor means coupled to receive the appropriate one of either said field A or said field B input key signal data samples and coupled to receive the corresponding field A or field B recirculated key signal data sample, where each said input key signal data sample and the corresponding recirculated key signal data sample comprise a corresponding pair of key signals, and minimum processor means for selecting and outputting as a corresponding minimum key signal data sample the smaller of each corresponding pair of input and recirculated key signal data samples, and each said key processor further comprising adder means coupled to receive each said input key signal data sample and the corresponding minimum key signal data sample, for adding each said minimum key signal data sample to the corresponding input key signal data sample to generate a result and for outputting each said result as said output key signal data sample, and wherein said keystore means further comprises field A and field B keystore means, each said field A or field B keystore means further comprising means for storing each said output key signals data sample for an interval equal to one frame and then to output all said output key signal data samples sequentially as said recirculated key signal data stream for the appropriate channel, wherein the output of said recirculated key signal data samples is synchronous with the receipt of the corresponding input key signal data sample stream of the new frame of input video signals for the corresponding channel, and wherein each said key processor means further comprises means for receiving each said minimum key signal data sample and the corresponding recirculated key signal data sample and for generating and outputting said corresponding field A or field B recirculated video processing key signal data sample by dividing each said minimum key signal data sample by the corresponding recirculated key signal data sample.

13. The apparatus of claim 12 further comprising recirculation gain control means coupled to receive a recirculation gain control signal for each of said channel A and channel B key processors and for adjusting the value of each corresponding said recirculated key signal data sample in accordance with the value of said recirculation gain control signal before said recirculated key signal data sample is received by the corresponding said minimum processor means.

14. The apparatus of claim 13 further comprising means coupled to receive both said streams of field A and field B input video data samples and both said streams of field A and field B input key signal data samples and coupled to receive an input gain control signal, for simultaneously adjusting the values of said input video data samples and said input key signal data samples according to the value of said input gain control signal.

15. The apparatus of claim 14 further comprising output video switch means coupled to said means for combining for outputting said field A combined video signals during said field A interval and for outputting said field B combined video signal during said field B interval.

16. The apparatus of claim 14 further comprising output switch means coupled to said means for combining and to said key processing means, for outputting said field A combined video signals during said field A interval and for outputting said field B combined video signal during said field B interval, and for outputting said field A output key signals during said field A interval and for outputting said field B output key signals during said field B interval.

17. The apparatus of claim 11 wherein said first means includes means for separate, parallel processing of said field A and field B input key signals and further comprising switch means coupled to select and output said field A combined video signal and said new field A recirculated key signal during said field A interval and for selecting and outputting said field B combined video signal and said new field B recirculated key signals during said field B interval.

18. The apparatus of claim 14 further comprising decay processor means coupled to receive said field A and field B recirculated video processing key signal data samples and coupled to manipulated the values of said recirculated field A and field B video signal data samples, for passing said recirculated field A and field B video signal data samples without altering the level of said recirculated field A and field B video signal data samples so long as the corresponding field A and field B recirculated video processing key signal data samples are above a threshold, but, as soon as said field A and field B recirculated video processing key signal data sample values drop below said threshold, for altering the values of the corresponding recirculated field A and field B video signal data samples to zero, said value reduction occurring prior to combining of said recirculated video signal data samples with the corresponding input video signal data samples.

19. The apparatus of claim 14 further comprising random gain adjustment means coupled to said recirculation gain control means and having a first input for receiving a first gain control signal and having a second input for receiving a second gain control signal for switching randomly between either said first gain control signal or said second gain control signal and for coupling the currently selected gain control signal to said recirculation gain control means as said recirculation gain control signal.

20. An apparatus for receiving input video data and combining it with recirculated video data to generate output video data which is a combination of said input video data and said recirculated video data, comprising:
    first means for receiving input video data defining interlaced fields A and B of a current frame of digital television signal data during alternating field intervals, each field defined by a plurality of raster lines, each line being comprised of a plurality of pixels, for interpolating field B data from field A data as the field A video data is being received and for interpolating field A video data from field B video data and the field B video data is being received;
    second means for combining during the interval when field A input video data is being received the field A input video data with field A recirculated video data to generate field A combined video data, and for combining the interpolated field B video data with field B recirculated video data during the interval when field A input video data is being received to generate field B combined video data, and for combining during the interval when field B input video data is being received the field B input video data with field B recirculated video data to generate field B combined video data, and for combining during the interval when field B input video data is being received the interpolated field A video data with field A recirculated video data to generate field A combined video data;
    third means coupled to said second means for receiving and storing separately said field A and B combined video data and for outputting said stored field A and field B combined video data as said field A and field B recirculated video data, respectively, synchronously with the output from said first means of video data defining a frame of input video data next subsequent in time; and
    fourth means coupled to said third means and to said second means and having separate inputs for field A and field B key signals indicating the desired level of the corresponding field A and field B input video data and for mathematically combining said field A and field B input key signals with corresponding field A and field B recirculated key signals indicating the level of the corresponding field A and field B recirculated video data such that corresponding field A and field B recirculated video key processing signals are generated which, when used to adjust the level of the corresponding said field A and field B recirculated video data, cause the corresponding said field A and field B combined video data to have a level which never exceeds a nominal level and which may embody one or more video effects, and for generating recirculated key signals and outputting said recirculated key signals at a key output, and for storing said recirculated key signals for a predetermined interval and for later recirculating of said recirculated key signals for use by said fourth means in a subsequent frame, said generation of said recirculated key signals being such that said recirculated key signals reflect the level of said corresponding field A and field B recirculated video data, said storing of each said recirculated key signal being for an interval equal to one frame of said input video data, said recirculation of said field A and field B recirculated key signals being synchronous with the receipt by said first means of the corresponding input video data, said fourth means also for adjusting the level of said field A and field B recirculated video data in accordance with the corresponding said field A and field B recirculated video key processing signals before coupling said field A and said field B recirculated video data to said second means.

21. The apparatus of claim 20 further comprising means coupled to both said field A and said field B input video data and to said field A and said field B key signals and having an input for receiving an input gain control signal, for simultaneously adjusting the values of said field A and said field B input video data and said field A and field B key signals in accordance with the value of said input gain control signal.

22. An apparatus for receiving input video data and combining it with recirculating video data to generate output video data which is a combination of said input video data and said recirculating video data, comprising:

interpolation means having a video data input for receiving, during alternating field intervals, input video data defining two interlaced fields of television video data, hereafter referred to as fields A and B input video data, where each field is comprised of a plurality of horizontal scan lines, each said line being comprised of a plurality of pixels, which collection of horizontal scan lines, taken together, define a raster and a video frame, and for outputting field A input video data at a field A output during the interval when said input field A video data is being received at said video data input, and for selectively interpolating and outputting field B interpolated video data from field A video data at a field B output during the interval when said input field A video data is being received at said video data input, and for outputting input field B video data at said field B output during the interval when said input field B video data is being received, and for selectively interpolating and outputting video data defining field A interpolated video data from field B video data at said field A output during the interval when said input field B video data is being received;

combiner means having field A and field B inputs coupled to simultaneously receive the video data, if any, at said field A and field B outputs of said interpolation means, respectively, and having field A and field B recirculated video data inputs for receiving field A and field B recirculated video data, for combining video data received at said field A input and the data received at said field A recirculated video data input for output as combined field A video data at a field A output during the interval when said field A video input data is being received, and for combining video data received at said field B input and the data received at said field B recirculated input for output as combined field B video data at a field B output;

store means coupled to said field A and field B outputs of said combiner means for separately storing said combined field A and field B video data and for outputting said field A and said field B combined video data as field A and field B recirculated data at separate field A and field B recirculated data outputs, said output of each of said field A and field B recirculated data pixels being in synchronism with the output of the corresponding pixel data, if any, of the corresponding field of video data from said interpolation means; and level adjustment means coupling said field A recirculated data output to said field A recirculated input of said combiner means and coupling said field B recirculated data output to said field B recirculated input of said combiner means, and having separate inputs for field A and field B key signals, for calculating field A and field B recirculated video key processing signals from said field A and B key signals and previously calculated recirculated field A and field B recirculated video key processing signals according to a predetermined algorithm and for storing said field A and field B recirculated video key processing signals for later output and use as said recirculated field A and field B recirculated video key processing signals and for calculating field A and field B derivative key signals from said field A and field B recirculated video key processing signals, and for using said field A and field B derivative key signals for adjusting the levels of the corresponding field A and field B recirculated video data pixels.

23. An apparatus for processing an input video signal formed of pairs of interlaced fields of video data of two field types, upon display each field having vertically distributed horizontal lines with the horizontal lines of one field type displayed at vertical locations of a raster interleaved between the display locations of the horizontal lines of the other field type, said apparatus comprising:

interpolation means for receiving video data of said input video signal of one field type and interpolating therefrom video data corresponding to the other field type to generate an interpolated field;

combining means for receiving recirculated fields of combined video data of one field type, receiving in succession and alternately in relation to said received recirculated fields input video signal fields of video data of said one field type and interpolated fields of video data of said other field type, and selectively combining video data of said recirculated fields of combined video data alternately with video data of said input video signal fields and of said interpolated fields of video data to form single fields of combined video data; and storage means for receiving each single field of combined video data, storing same for a selected interval, and retrieving said stored single field of combined video data to provide said recirculated field of combined video data.

24. Apparatus for producing a video special effect by combining an input video signal with a recirculated video signal to produce an output video signal, each of said video signals having a gain identified by the value of respective key signals that signify differences between the gain of the video signal and a selected reference gain, said apparatus comprising:

a video input for receiving an input video signal;

a key input for receiving an input key signal where said input key signal has at least a portion which has a value less than one but greater than zero;

combining means having a first input coupled to receive said input video signal and having a second input for receiving said recirculated video signal, for combining said input video signal with said recirculated video signal to generate said output video signal at an output;

store means coupled to said output and having a recirculated video signal output, for storing said output video signal for a predetermined interval and then for outputting said stored output video signal at said recirculated video output as said recirculated video signal;

level adjustment means coupled between said recirculated video output and said second input, and having a key signal input for receiving a recirculated video processing key signal, for adjusting the level of said recirculated video signal in accordance with said recirculated video processing key signal and for coupling the level adjusted recirculated video signal to said second input;

a keystore means having an input and an output, for receiving a new recirculated key signal at said input, storing said new recirculated key signal for a predetermined interval and then for outputting said new recirculated key signal at said output as said recirculated key signal;

key processor means coupled to said key input and coupled to said input of said keystore means and having a recirculated key output coupled to said key signal input of said level adjustment means and having a recirculated key signal input coupled to said output of said keystore means, for receiving said recirculated key signal from said keystore means, and for calculating said recirculated video processing key signal from said input key signal and said recirculated key signal and for outputting said recirculated video processing key signal at said recirculated key output, and for calculating said new recirculated key signal from said input key signal and said recirculated key signal and for outputting said new recirculated key signal to said input of said keystore means for storage.

25. The apparatus of claim 24 further comprising means coupled between said output of said keystore means and said recirculated key signal input of said key processor means and having an input for receiving a recirculated video gain control signal, for adjusting the level of said recirculated key signal received from said keystore means in accordance with said recirculated video gain control signal, and for coupling both the level adjusted recirculated key signal and the non level adjusted recirculated key signal to said key processor means for use in calculating said new recirculated key signal and said recirculated video processing key signal.

26. The apparatus of claim 25 further comprising means for randomly changing said recirculation video gain control signal.

27. The apparatus of claim 25 further comprising means in said level adjustment means for blocking the alteration of the level of said recirculated video signal regardless of changes in said recirculated video key processing signal until said recirculated video processing key signal falls below a threshold, and, when said recirculated video processing key signal falls below said threshold, for reducing the level of said recirculated video signal to a predetermined level.

28. The apparatus of claim 25 further comprising means in said level adjustment means for altering the level of said recirculated video signal in accordance with a selected one of a plurality of recirculated video processing key signals, calculated from a plurality of said recirculation video gain control signals, randomly selected.

29. The apparatus of claim 25 further comprising means coupled to said video input and coupled to said key input and having an input for receiving an input gain control signal for simultaneously adjusting the levels of said input video signal and said input key signal in accordance with the level of said input gain control signal.

30. The apparatus of claim 25 further comprising means coupled to said level adjustment means and to said key processor means for randomly altering the level of said recirculated video signal by simultaneously randomly altering the value of said recirculated video processing key signal.

31. Apparatus for processing a plurality of sequential frames of input video signals comprising:

video concentrator means having a plurality of video inputs and a plurality of corresponding key signal inputs, for receiving a plurality of video input signals defining a plurality of current frames of video, and for receiving a plurality of corresponding input key signals indicating the level adjustments to be made by said video concentrator means of the corresponding video input signal, and having a combined video signal input for receiving a combined video signal defining a current frame of a plurality of sequential frames of said combined video signal, and having a combined video key signal input for receiving a combined video key signal corresponding to said combined video signal indicating the level of said combined video signal, and having at first video output and a corresponding key signal output and having a second video output and a corresponding second key signal output, for combining a selected combination of said input video signals after adjusting the levels thereof in accordance with the corresponding input key signals with said combined video signal to generate an output video signal at said first video output and for outputting at said key signal output a concentrator output key signal indicative of the level of said output video signal, and for combining a selected combination of said input video signals after level adjustment thereof in accordance with the corresponding input key signals with said combined video signal to generate a second output video signal at said second video output and for combining the keys signals corresponding to the video signals combined to generate said second output signal to generate a second output key signal so as to have a level indicative of the level of said second output video signal and for outputting said second output key signal at said second key signal output;

a recirculating framestore means, including a keystore means, having a video input coupled to said second video output and having a key input coupled to said second key signal output of said video concentrator means and having a video output coupled to said combined video signal input, and having a key signal output coupled to said combined video key signal input, for receiving said second video output signal and said second output key signal and for combining said second video output signal with a level adjusted recirculated video signal comprised of stored video signals from previous frames of said second video output signal from said video concentrator means, and for outputting the resultant combined video signals to said video concentrator means combined video signal input as said combined video signal, and for storing said combined video signals for a predetermined interval and then outputting said stored combined video signals as said recirculated video signals for combination with a new frame of said second video output signals from said video concentrator means, said framestore means further comprising means for receiving said second output key signal corresponding to said current frame of said second video output signal and for calculating a new recirculated key signal from said second output key signal and a recirculated key signal from the previous frame, and for receiving said recirculated video signal and for adjusting the level of said recirculated video signal in accordance with the value of said new recirculated key signal to generate said level adjusted recirculated video signal, and for storing said new recirculated key signal for a predetermined interval and then outputting the stored new recirculated key signal as said recirculated key signal.

32. The apparatus of claim 31 further comprising means for selectively, randomly altering said new recirculated key signal used to adjust the level of said recirculated video.

33. The apparatus of claim 32 further comprising means for decreasing the values of said new recirculated key signal but not altering the level of said recirculated video signal until the level of said new recirculated key signal falls below a predetermined threshold, and then for decreasing the level of said recirculated video signal to zero.

* * * * *